R. E. HELLMUND.
DYNAMO ELECTRIC MACHINE.
APPLICATION FILED APR. 12, 1915.
1,311,510.
Patented July 29, 1919.
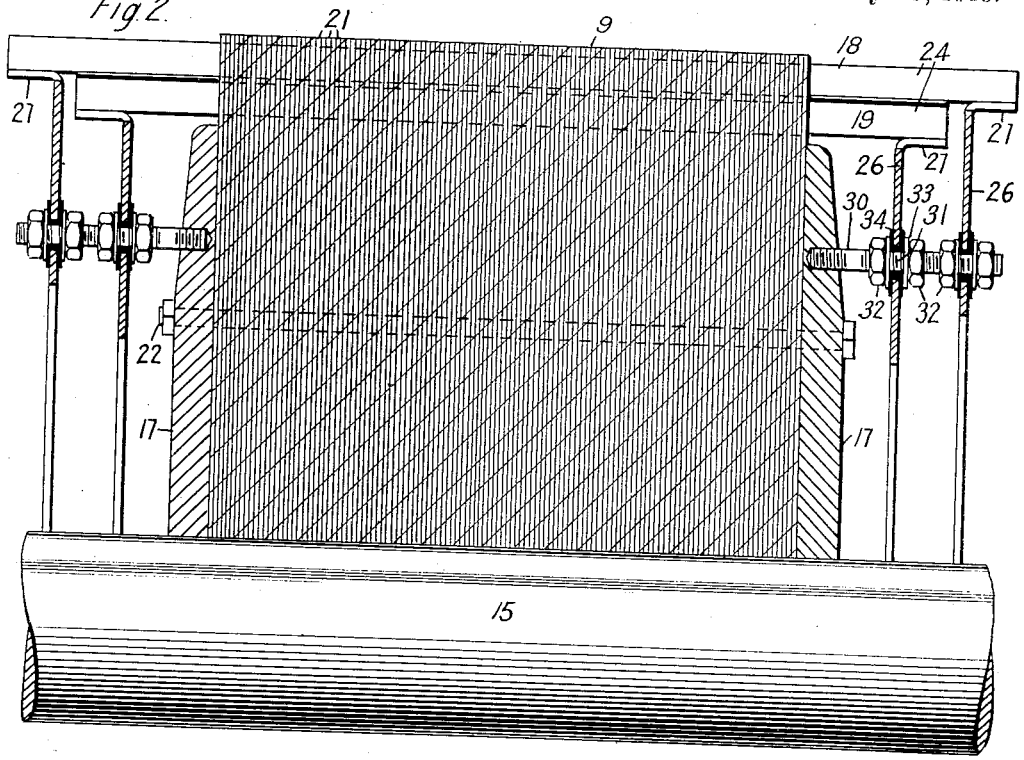
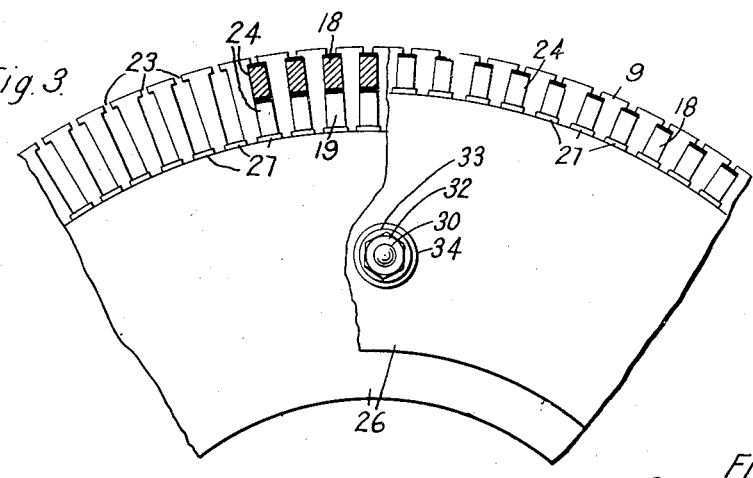
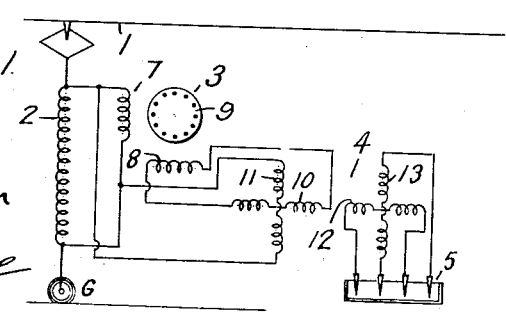
WITNESSES:
Fred H Miller
D. W. Mace
INVENTOR
Rudolf E Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,311,510.   Specification of Letters Patent.   Patented July 29, 1919.

Application filed April 12, 1915. Serial No. 20,694.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Dynamo-Electric Machines, of which the following is a specification.

My invention relates to dynamo-electric machines, and it has special reference to so-called phase converters such as are employed for converting single-phase alternating-current energy into polyphase energy for the purpose of supplying polyphase electric motors.

One of the objects of my invention is to provide machines of the above-indicated character which shall be relatively simple, inexpensive and rugged in construction, efficient in operation and adapted particularly to minimize the eddy-current losses in the rotor winding.

Another object of my invention is to simplify and improve the end-ring construction of machines of this general character and to provide end-rings of sheet material that are so fashioned as to be intimately secured to the bars of the rotor winding with facility and at relatively small expense.

Heretofore, when phase converters of the induction type have been employed, it has been customary to provide the rotor with a single squirrel-cage winding. With large-capacity machines of this class, however, the section of the current-carrying conductors of the squirrel-cage winding becomes relatively great, and excessive heating is produced. Upon investigation, I have determined that the frequency of the induced currents in the rotor windings of a phase converter is double that of the source of energy to which the converter is connected, and, therefore, the heating effect referred to is a direct result of the abnormal eddy currents produced in the large rotor conductors by reason of the relatively high frequency of the secondary currents.

According to my present invention, I propose to obviate the difficulties hereinbefore mentioned and to materially reduce the eddy-current losses in the rotor windings by employing a plurality of separate and independent squirrel-cage windings that are disposed in the peripheral slots of the rotor. Thus, the otherwise large mass of the rotor conductors is sub-divided or split up into several windings of relatively small section, with the result that the eddy-current losses are corespondingly reduced.

My invention is illustrated in the accompanying drawing, in which Figure 1 is a diagrammatic view of the circuit connections of a phase converter that is adapted to receive energy from a single-phase source and to supply polyphase energy to a driving motor; Fig. 2 is a view, partially in section and partially in side-elevation, of a portion of a rotor of a phase converter constructed in accordance with my invention; Fig. 3 is a view, partially in section and partially in end elevation, of the apparatus shown in Fig. 2; and Fig. 4 is a view, in end elevation, of a portion of an end-ring employed in the machine shown in Figs. 2 and 3.

Referring particularly to Fig. 1 of the drawing, a supply circuit conductor 1, such, for instance, as a trolley conductor of a railway system, delivers single-phase alternating-current energy to a transformer 2 that is connected to a return conductor at G and which supplies single-phase energy to a phase converter 3, said converter being adapted to supply polyphase energy for operating a polyphase electric motor 4 which is governed through the agency of an adjustable resistor 5.

The phase converter 3 comprises a magnetizable stator (not shown) that is provided with a plurality of independent windings 7 and 8 that are disposed in quadrature relation and are inductively related to a rotor 9, preferably of the squirrel-cage type. The winding 7 is the exciting winding of the converter and is connected in multiple circuit and in phase with the transformer 2, while the winding 8 is the secondary winding and is adapted to deliver a voltage substantially equal in amount to that of the transformer 2, but which is displaced 90° thereto in phase position.

The converter secondary winding 8 is connected directly across a primary winding 10 of the motor 4, while primary winding 11, which is in quadrature relation therewith, is connected in multiple to the transformer winding 2. Thus, two-phase energy is supplied to the polyphase motor 4, as will be understood.

The motor 4 also embodies secondary windings 12 and 13 that are disposed in quadrature relation and are suitably connected to the adjustable resistor 5 which may conveniently comprise a liquid rheostat, although any other suitable device may be employed.

Obviously, my invention is not limited, in any sense, to the arrangement of windings of the driving motor set forth, and, although I have illustrated a two-phase machine, my invention is equally applicable to any form of polyphase electrical apparatus.

Reference may now be had to Figs. 2 and 3, in which the phase converted rotor 9 is shown as embodying a shaft 15, a magnetizable core 16, end-plates 17 and a plurality of squirrel-cage windings 18 and 19.

The magnetizable core 16 preferably comprises a plurality of laminations 21 that are assembled in side-by-side relation and are compactly secured together between the end-plates 17 by means of rivets or bolts 22. The magnetizable core member 16 is provided with a plurality of peripheral slots 23 into which the respective squirrel-cage windings 18 and 19 are disposed, the one above the other, in concentric rows.

In general construction, the squirrel-cage windings 18 and 19 are alike, although the longitudinal conductors or bars 24 of the outer winding 18 are longer than those of the inner winding 19 and project beyond them at each end. The concentric rows of conductors or bars 24 constituting parts of the independent windings 18 and 19, have their respective ends electrically connected to a plurality of end-rings 26, said rings 26 preferably comprising annular rings of sheet material that are provided with equally-spaced bent-over integral lips or ears 27 that are intimately welded or otherwise secured to the end portions of the conducting bars 24. The end-rings 26 conveniently constitute punchings or stampings of the form shown in Fig. 4 which embody the equally-spaced radially projecting ears 27 that are bent over at substantially right-angles, by any suitable means into the positions shown in Figs. 2 and 3. By reason of the relative thinness and flexibility of the sheet metal ears 27, the construction is particularly well adapted for brazing and welding operations, and a good electrical contact between the bars 24 and ears 27 may thus be secured.

Inasmuch as the conducting bars 24 of the outer winding 18 project beyond the inner winding 19, the end-rings 26 of the respective windings are spaced in side-by-side relation in a longitudinal direction, as shown in Fig. 2, and, therefore, may be conveniently supported and rigidly positioned by means of a plurality of bolts 30 which are suitably attached to the respective end-plates 17. The bolts 30 project through openings 31 in the adjacently located end-rings 26 and said rings are rigidly associated therewith by means of nuts 32, washers 33 and insulating bushings 34. The end-rings 26 of the respective windings 18 and 19 are thus insulated, the one from the other, in the manner described and, therefore, the component parts of the rotor winding, as a whole, are entirely independent.

By reason of the divided form of rotor winding set forth, it is manifest that the sections of current-carrying conductors may be reduced to a size that will prevent the development of excessive eddy currents which the relatively high-frequency induced currents have a tendency to produce. If desired, more than two sections of rotor winding may be provided, as will be understood.

Modifications in the specific structural details and arrangement and location of parts may be effected within the spirit and scope of my invention, and such modifications are intended to be covered by the appended claims.

I claim as my invention:

1. A dynamo-electric machine comprising a magnetizable rotor having peripheral slots, and a pair of squirrel-cage windings of substantially equal reactance disposed therein in concentric relation and each embodying end rings disposed at the respective ends thereof, and means coöperating with said end rings and said magnetizable rotor for rigidly positioning said rings and insulating them from each other and means for otherwise insulating said windings from each other.

2. In a dynamo-electric machine of the induction type, the combination with a secondary core member, of a plurality of conductively independent secondary windings of similar pole arrangement thereon, each of said windings having substantially the same ratio of reactance to ohmic resistance.

3. In a dynamo-electric machine of the induction type, the combination with a secondary core member, of a plurality of conductively independent secondary windings of similar pole arrangement thereon, each of said windings embracing substantially the entire circumference of said secondary member and having substantially the same ratio of reactance to ohmic resistance.

4. In a dynamo-electric machine of the induction type, the combination with a secondary core member, of a plurality of conductively independent short-circuited windings thereon of similar pole arrangement and of substantially equal reactance.

5. In a dynamo-electric machine of the induction type, the combination with a secondary core member, of a plurality of conductively independent short-circuited squirrel-cage windings thereon of substantially equal reactance.

6. In a dynamo-electric machine of the induction type, the combination with a slotted magnetizable secondary core member, of a plurality of independently conductive squirrel-cage members disposed in the slots of said core member and adapted to concurrently carry substantially equal portions of any secondary currents that may be produced in the operation of said machine.

7. In a dynamo-electric machine of the induction type, the combination with a slotted magnetizable secondary core member, of a plurality of independently conductive squirrel-cage members disposed in the slots of said core member and adapted to divide the total load currents of said secondary member in accordance with a predetermined ratio during different operating speeds of said dynamo-electric machine.

In testimony whereof I have hereunto subscribed my name this 30th day of March, 1915.

RUDOLF E. HELLMUND.